United States Patent [19]

Kaufman

[11] 4,438,085

[45] Mar. 20, 1984

[54] PREPARATION OF DIHYDROXYALUMINIUM SODIUM CARBONATE

[75] Inventor: Jeffrey L. Kaufman, Mulgrave, Australia

[73] Assignee: Nicholas Proprietary Limited, Victoria, Australia

[21] Appl. No.: 325,422

[22] PCT Filed: Mar. 26, 1981

[86] PCT No.: PCT/AU81/00036

§ 371 Date: Nov. 23, 1981

§ 102(e) Date: Nov. 23, 1981

[87] PCT Pub. No.: WO81/02728

PCT Pub. Date: Oct. 1, 1981

[30] Foreign Application Priority Data

Mar. 28, 1980 [GB] United Kingdom ................. 8010521

[51] Int. Cl.$^3$ .................... C01F 7/00; A61K 33/06; A61K 33/08; A61K 33/10
[52] U.S. Cl. .................................................. 423/419 P
[58] Field of Search ............................. 423/419 P, 115

[56] References Cited

U.S. PATENT DOCUMENTS

| | | |
|---|---|---|
| 2,783,127 | 2/1957 | Grote . |
| 2,783,179 | 2/1957 | Grote ............................. 423/419 P |
| 3,115,387 | 12/1963 | Lewin . |
| 3,389,975 | 6/1968 | Van Nostrand ..................... 423/115 |
| 3,911,090 | 10/1975 | Hem et al. ........................ 423/419 P |
| 4,053,568 | 10/1977 | Madaus et al. ................... 423/415 P |

OTHER PUBLICATIONS

Jackson et al., Synthesis and Characterization of Dawsonite, Bureau of Mines Report of Investigation 7664, 1972.

*Primary Examiner*—Gary P. Straub
*Attorney, Agent, or Firm*—Oblon, Fisher, Spivak, McClelland & Maier

[57] ABSTRACT

Dihydroxyaluminium sodium carbonate is prepared by reaction between an ionic aluminium salt and a stoichiometric excess of sodium carbonate in aqueous medium in the presence of sodium hydroxide at a pH in the range 7.2 to 10.5. An amount of sodium carbonate at least ten times, and preferably fifteen times, by weight that of the aluminium salt is used and/or sodium salt by product, but not sodium carbonate, is precipitated from the aqueous medium. Preferably, the sodium salt is precipitated by saturation of the aqueous medium with sodium carbonate and sodium salt by-product at a sodium carbonate concentration less than the invarient concentration for sodium carbonate and consequently at a sodium salt by product concentration greater than the invarient concentration for sodium salt by product. The sodium carbonate-containing aqueous medium after separation of sodium salt by-product is reused as a source of sodium carbonate for subsequent reaction with additional aluminium salt.

13 Claims, 2 Drawing Figures

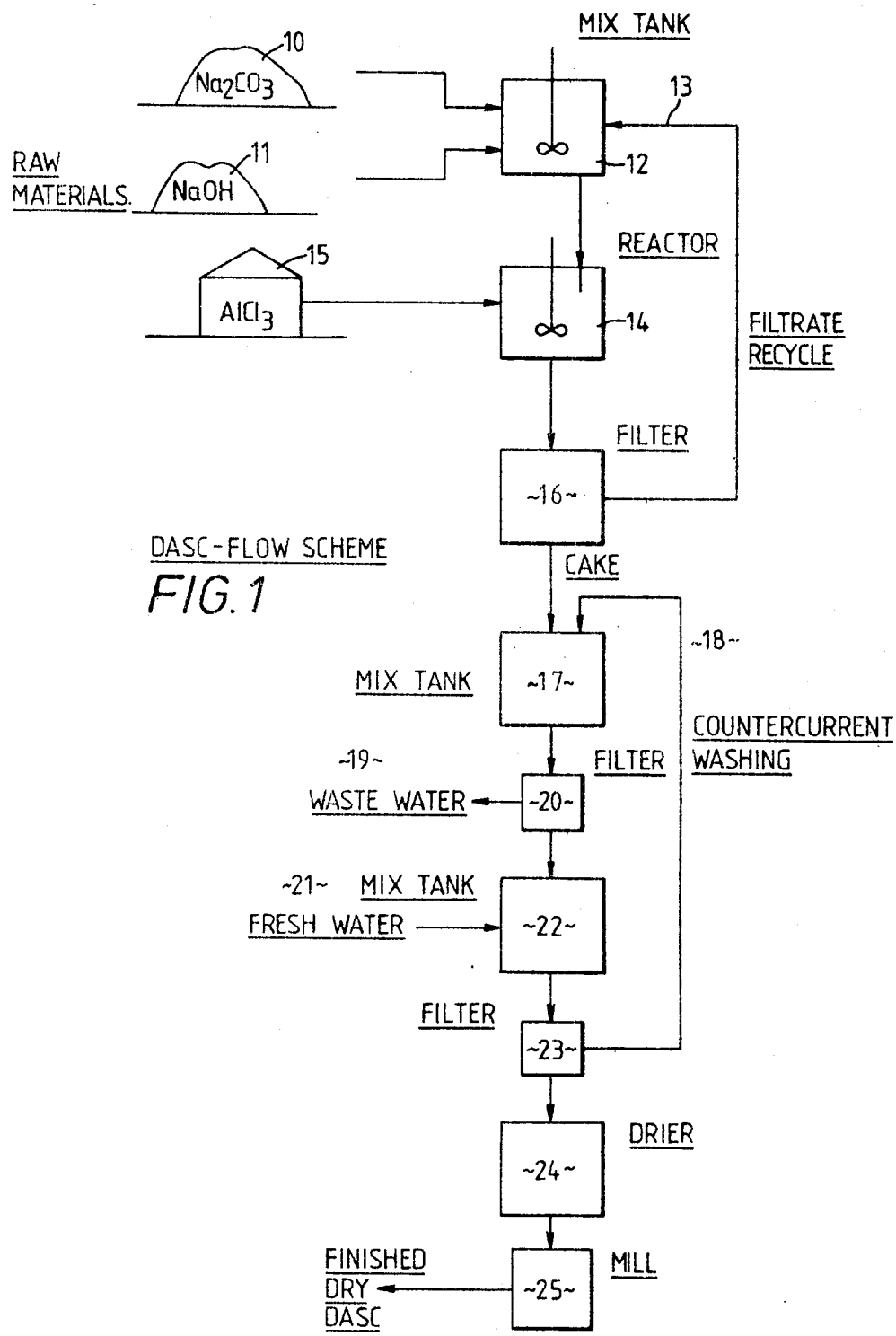

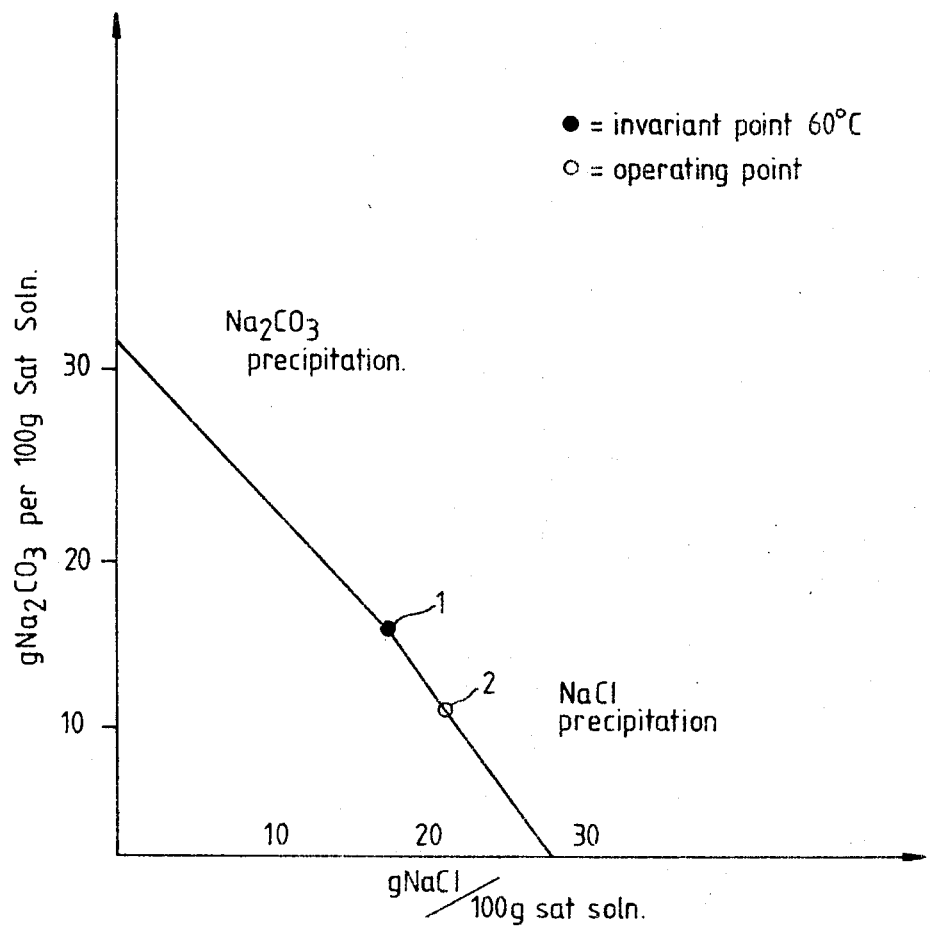
FIG. 2  Solubility Diagram 60°C
NaCl/Na₂CO₃/Water.

PREPARATION OF DIHYDROXYALUMINIUM SODIUM CARBONATE

The present invention relates to dihydroxyaluminum sodium carbonate and provides an improved method for its manufacture. In this specification, the abbreviation "DASC" will be used for "dihydroxyaluminium sodium carbonate".

DASC is probably the most widely used gastric antacid in the world. It has the formula $(HO)_2AlOCO_2Na$ and is usually prepared by a batch process in which aluminium isopropylate (i.e. aluminium triisopropoxide) is contacted with sodium bicarbonate in water (see U.S. Pat. No. 2,783,179). Other methods of manufacture are known. In particular, Japanese Patent Application No. 38318/1972 discloses a process which can be operated continuously and in which an aluminium salt is contacted with sodium carbonate in water at a pH maintained in the range 7.2 to 10.5 by addition of sodium hydroxide and, if necessary, carbon dioxide.

The specification of Japanese Patent Application No. 38318/1972 states that the aluminium salt and sodium carbonate can be added in equal parts but that it is preferable to use an excess of sodium carbonate to provide more than two moles $CO_2$ per mole $Al_2O_3$. The Examples provided in the specification use essentially stoichiometric amounts of aluminium salt and sodium carbonate. In particular, Examples 1 and 3 use an $Al_2O_3$:$CO_2$ mole ratio of 1:2 and in Example 2 said mole ratio is 1:4. The only claim of the Japanese application specifies aluminium chloride as the aluminium salt but aluminium sulphate, aluminium nitrate, aluminium acetate, alum and aluminium hydroxide are stated in the specification to be suitable aluminium salts. There is no exemplification of the use of aluminium chloride as the aluminium salt and the only Examples in the specification exemplify the use of aluminium sulphate and aluminium hydroxide as the aluminium salt. When the procedures reported in Examples 1 and 2 were repeated by us with the only differences being that aluminum chloride was used instead of aluminium sulphate and the reaction was carried out on a smaller scale, substantially no DASC was obtained by the procedure of Example 1 and only low purity DASC was obtained by the procedure of Example 2. When Example 3 was repeated by us using a commercial grade aluminium hydroxide, no DASC was obtained.

The process of Japanese Patent Application No. 38318/1972 had the advantages over the usual process of manufacturing DASC from aluminium isopropylate that relatively inexpensive inorganic aluminium salts can be used and that it is capable of continuous operation. It appears that the Japanese process has not been operated commercially.

It will be appreciated from the above that, whilst Japanese Patent Application No. 38318/1972 teaches a new and potentially useful process of obtaining DASC from aluminium salts and sodium carbonate, the process parameters taught are not sufficient for the process to be used on a commercial scale or to obtain high purity DASC. It is an object of the present invention to modify and improve this process to obtain high purity DASC on a commercial scale.

It has now been found that DASC can be obtained in good yield and relatively high purity by contacting an ionic aluminium salt, especially aluminium chloride with an amount of sodium carbonate substantially in excess of the stoichiometric amount. Further, process parameters have been developed which cause the sodium salt by-product produced to be precipitated with the DASC thereby facilitating recycling of sodium carbonate.

According to a first aspect of the present invention, there is provided a method of preparing dihydroxyaluminium sodium carbonate which comprises contacting an ionic aluminium salt with a stoichiometric excess of sodium carbonate in aqueous medium in the presence of sodium hydroxide at a pH in the range 7.2 to 10.5 wherein at least ten parts by weight of sodium carbonate are used per part by weight of the aluminium salt.

According to a second aspect of the present invention, there is provided a method of preparing dihydroxyaluminium sodium carbonate which comprises contacting an ionic aluminium salt, with a stoichiometric excess of sodium carbonate in aqueous medium in the presence of sodium hydroxide at a pH in the range 7.2 to 10.5 and subsequently separating precipitated dihydroxyaluminium sodium carbonate from the aqueous medium, wherein sodium salt with the anion of the aluminium salt reactant is precipitated and separated from the aqueous medium but substantially all the sodium carbonate is retained in the aqueous medium at least until after separation of said sodium salt by-product therefrom.

In a preferred embodiment of the invention, both of said aspects are combined to provide a method of preparing dihydroxyaluminium sodium carbonate which comprises contacting an ionic aluminium salt with a stoichiometric excess of sodium carbonate in aqueous medium in the presence of sodium hydroxide at a pH in the range 7.2 to 10.5 and subsequently separating the precipitated dihydroxyaluminium sodium carbonate from the aqueous medium, wherein at least ten parts weight of sodium carbonate are used per part by weight of aluminium salt and sodium salt with the anion of the aluminium salt reactant is precipitated and separated from the aqueous medium but substantially all the sodium carbonate is retained in the aqueous medium at least until after separation of said sodium salt by-product therefrom.

It is preferred that at least fifteen parts by weight of sodium carbonate are used per part by weight of aluminium salt. It is also preferred that the aluminium salt is aluminium chloride but other ionic aluminium salts can be used, for example aluminium sulphate, aluminium nitrate, aluminium acetate and alum.

In the second aspect of the invention, the sodium salt by-product can be precipitated from the aqueous medium at any time but preferably is precipitated with the DASC. It is preferred that the precipitation of the sodium salt by-product and solution of the sodium carbonate is effected by controlling the relative amounts of the reactants and the other process parameters so that (a), when the sodium salt by-product is to be precipitated, the aqueous medium is saturated with sodium carbonate and sodium salt by-product at a sodium carbonate concentration less than the invarient concentration for sodium carbonate and consequently at a sodium chloride concentration greater than the invarient concentration for sodium salt by-product and (b), at any time before precipitation of the sodium salt by-product, the aqueous medium is unsaturated with sodium carbonate and sodium salt by-product. Suitably, the said saturated state is maintained substantially from commencement of the reaction until after separation of the solids content. However, the said unsaturated state can be maintained initially until, for example, after separation of the DASC and then the saturated state obtained by, for example, concentration of the aqueous medium, addition of sodium carbonate or, more usually, cooling of the aqueous medium.

When water is saturated with sodium carbonate and sodium chloride, the material which precipitates from the solution upon addition of more sodium carbonate and/or sodium chloride will depend upon the relative proportions of sodium carbonate and sodium chloride in the saturated solution and the temperature of the solution. The common cation ion effect between sodium carbonate and the sodium salt by-product is such that there will be only one combination of sodium carbonate and sodium salt by-product concentrations in the saturated solution at which both sodium carbonate and sodium salt by-product will be precipitated. This combination constitutes the so-called 'invariant point' on the solubility curve and respective concentrations of sodium carbonate and sodium salt by-product are their 'invariant concentration'. If the sodium carbonate concentration in the saturated solution is above the invariant concentration for sodium carbonate the addition of either sodium carbonate or sodium salt by-product will cause sodium carbonate to be precipitated from the saturated solution. Conversely, if the concentration of sodium carbonate in the saturated solution is below the invariant concentration for sodium carbonate, addition of either sodium carbonate or sodium salt by-product will cause sodium salt by-product to precipitate from the solution. The invariant concentrations are temperature dependent and therefore the temperature of the saturated solution must be controlled in order to maintain a stable invariant point.

It will be appreciated that by maintaining the reaction parameters such that the aqueous medium is saturated with sodium carbonate and sodium salt by-product with a sodium carbonate concentration below the invariant concentration for sodium carbonate, the bulk of the sodium salt by-product is precipitated but substantially none of the excess sodium carbonate is precipitated. When the precipitate is separated from the aqueous medium, the filtrate obtained has a relatively low sodium salt by-product concentration compared with the amount of the sodium salt produced in the reaction and therefore can be re-used in the process without treatment to remove the sodium salt. If the sodium salt is precipitated with the DASC, it can be removed by washing the residue with water to leave the substantially insoluble DASC. The capability of removing sodium salt by-product by precipitation makes it possible to recycle the excess sodium carbonate and maintain a high sodium carbonate concentration during the reaction and keep the $Al_2O_3:CO_2$ mole ratio at the required high level. Thus the precipitation of the sodium salt by-product makes it cost effective to use a substantial excess of sodium carbonate over aluminium chloride in the manufacture of DASC.

The yield and purity of DASC produced by contacting an aluminium salt with a stoichiometric excess of sodium carbonate as described in Japanese Patent Application No. 38318/1972 is unexpectedly improved by using sodium carbonate in an excess substantially greater than that reported in the Japanese application. The amount of sodium carbonate required in order to provide this improvement is at least ten, preferably at least fifteen parts by weight sodium carbonate per part by weight aluminium chloride. Whilst the advantages of precipitating the sodium salt by-product but not sodium carbonate is of general application, it is preferred that, in the second aspect of the invention as defined above, the amount by weight of sodium carbonate reactant should be at least ten, preferably at least fifteen times the amount by weight of aluminium salt reactant.

Sodium bicarbonate is produced by reaction between aluminium salt and sodium carbonate. When using the preferred aluminium chloride, the reaction can be represented by the following reaction equation:

$$3Na_2CO_3 + AlCl_3 + 2H_2O = DASC + 3NaCl + 2NaHCO_3$$

The presence of sodium hydroxide in the reaction medium converts the sodium bicarbonate to sodium carbonate and this reaction can be represented by the following reaction equation:

$$2NaHCO_3 + 2NaOH = 2H_2O + 2NaCO_3$$

Thus, the overall reaction scheme can be represented by the following equation:

$$Na_2CO_3 + AlCl_3 + 2NaOH = DASC + 3NaCl$$

If sodium bicarbonate is present in the reaction mixture, the mutual solubility curve for sodium carbonate and sodium chloride or other sodium salt by-product is dramatically changed. Accordingly, sufficient sodium hydroxide should be present to ensure that all the sodium bicarbonate produced is converted into sodium carbonate. However, any excess of sodium hydroxide must not be sufficient to increase the pH of the reaction medium above 10.5 and thereby solubilise DASC. It is preferable to operate the process of the invention at a pH between 10.2 and 10.5. This preferred pH range is in contrast with the teachings of Japanese Patent Application No. 38318/1972 where it is recommended that a pH above 10.2 should not be used because of formation of perlite with consequential reduction in the yield of DASC.

The reaction can be carried out at a temperature between ambient temperature and the boiling point of the reaction medium. However, it is preferred that the reaction is carried out at a temperature in the range 40° to 80° C., especially about 60°. In view of the temperature dependence of the invariant concentrations of sodium carbonate and sodium salt by-product, it is preferred that a constant temperature is maintained throughout precipitation of the sodium salt by-product and until separation of said sodium salt from the aqueous medium.

The invention has particular application to the continuous manufacture of DASC although it also has application to batchwise manufacture of DASC. In such continuous manufacture, the amount of sodium carbonate supplied to the reactor and other process parameters are maintained so that the aqueous medium leaving the reactor is saturated with sodium carbonate and sodium salt by-product with a sodium carbonate concentration below its invariant concentration. The solids content comprised of precipitated sodium salt by-product and DASC is separated from the aqueous medium and the filtrate is re-cycled to the reactor to provide part of the sodium carbonate supply. Conveniently, the reaction temperature is about 60° C. and a constant temperature is maintained until separation of the solids content. At this temperature, it is preferred that the aqueous medium leaving the reactor contains about 10% by weight sodium carbonate and about 20% by weight sodium salt by-product. Suitably, the reaction time is between two and three hours.

The following is a description, by way of example only and with reference to the drawings of a presently preferred embodiment of the invention. In the drawings:

FIG. 1 is a flow diagram showing the manufacture of DASC in accordance with the preferred embodiment, and FIG. 2 is an approximation of mutual solubility curve for sodium carbonate and sodium chloride in water at 60° C.

Referring first to FIG. 2, there is shown an approximation of a solubility curve for sodium carbonate and sodium chloride in water at 60° C. In the graph shown, the ordinate is sodium carbonate concentration of the saturated solution in percentage by weight and the abscissa is sodium chloride content of the saturated solution in percentage by weight. The curve or line represents the relative concentrations of sodium carbonate and sodium chloride which make up saturated solutions of the system at 60° C. The invariant point at this temperature is indicated at 1. This point corresponds to a sodium carbonate concentration of about 15% by weight and a sodium chloride concentration of about 17% by weight. Processes in accordance with the second aspect of the present invention are conducted with the saturated solution corresponding to a point on the solubility curve below the invariant point. In other words, the concentration in the saturated solution of sodium carbonate is below the invariant concentration for sodium carbonate whereas the concentration of sodium chloride in the saturated solution is above the invariant concentration for sodium chloride. In the preferred embodiment presently being described a continuous process is carried out in which the aqueous medium passing from the reactor is a saturated solution corresponding to an operating point indicated at 2, i.e. having a sodium carbonate concentration of about 10% and a sodium chloride concentration of about 20%.

Referring now to FIG. 1, sodium chloride from supply 10 and sodium hydroxide from supply 11 are mixed in a stirred tank 12 with re-cycle filtrate 13. The mixture is supplied to a stirred reactor 14 into which aluminium chloride is supplied from a supply 15. The reaction mixture is fed from the reactor 14 to a filtering device 16 where the solids content is separated from the aqueous filtrate 13. The filter cake is washed in a first mixing tank 17 with the filtrate 18 from a subsequent washing step. Aqueous sodium chloride solution 19 is removed from the washed cake in a filtering device 20. The cake is then washed with fresh water 21 in a second mixing tank 22. DASC product is filtered off in a second filtering device 23 and the filtrate 18 is fed to the first mixing tank 17. DASC is subsequently dried in a drier 24 and then crushed in a mill 25 to provide the desired product in good yield and at relatively high purity.

The temperature in reactor 14 and filter 16 is maintained at about 60° C. and the mean residence time in the reactor is about three hours. Sodium carbonate is supplied from supply 10 to tank 12 at such a rate that the aqueous medium leaving the reactor 14 is saturated with sodium carbonate and sodium chloride with a sodium carbonate concentration about 10% by weight.

The amount of sodium hydroxide is supplied to tank 12 from supply 11 at a rate to prevent free sodium hydroxide or sodium bicarbonate being in the reactor feed. The amount of aluminium chloride supplied to the reactor 14 from the supply 15 is such that the ratio by weight of aluminium salt to sodium carbonate and sodium hydroxide mixture entering the reactor 14 is about 1:20.

EXAMPLE

Using the apparatus in accordance with the flow diagram of FIG. 1, 1,107.77 kg./day sodium carbonate, 55.56 kg/day sodium hydroxide and 19,294.29 kilograms per day of recycled filtrate were mixed together and then added to the reactor. 330.70 kg/day aluminium chloride was also added to the reactor and the reactants mixed in the reactor for a mean residence time of three hours. The solids content was filtered to provide 494.23 kg/day solids which was subsequently washed, dried and crushed to provide 111.99 kg/day DASC. 4,905 kg/day fresh water was employed in the washing process and 5,105 kg/day sodium chloride solution removed during the washing process. The temperature in the mixing tank, reactor and filter was maintained at 60° C.

At present costings DASC can be produced by the method disclosed above at a cost of about one half of the cost of production from aluminium isopropylate and sodium bicarbonate.

I claim:

1. A method of preparing dihydroxyaluminum sodium carbonate, which comprises:

synthesizing said dihydroxyaluminum sodium carbonate by reacting an aluminum salt selected from the group consisting of aluminum chloride, aluminum nitrate, aluminum sulfate, aluminum acetate and alum with a stoichiometric excess of sodium carbonate in a ratio of at least 10 parts by weight sodium carbonate to said aluminum salt in a basic aqueous medium containing sodium hydroxide in an amount sufficient to ensure the presence of no sodium bicarbonate in solution but in an amount which does not permit the pH of the solution to exceed 10.5 at a temperature ranging from 40° to 80° C.;

precipitating dihydroxyaluminum sodium carbonate and the salt formed from sodium ion and the anion of the aluminum salt reactant from the aqueous medium with substantially all of the unreacted sodium carbonate being retained in the aqueous medium at least until separation of said precipitated sodium salt is effected; and washing said precipitated dihydroxyaluminum sodium carbonate free of coprecipitated sodium salt, thereby obtaining the desired dihydroxyaluminum sodium carbonate product.

2. A method of preparing dihydroxyaluminum sodium carbonate, which comprises:

synthesizing said dihydroxyaluminum sodium carbonate by reacting an aluminum salt selected from the group consisting of aluminum chloride, aluminum nitrate, aluminum sulfate, aluminum acetate and alum with a stoichiometric excess of sodium carbonate in a ratio of at least 10 parts by weight sodium carbonate to said aluminum salt in a basic aqueous medium containing sodium hydroxide in an amount sufficient to ensure the presence of no sodium bicarbonate in solution but in an amount which does not permit the pH of the solution to exceed 10.5 at a temperature ranging from 40° to 80° C.;

precipitating product dihydroxyaluminum sodium carbonate from solution, thereby obtaining the desired purified product; and thereafter precipitating the salt formed from sodium ion and the anion of the aluminum salt reactant from the aqueous medium with substantially all of the unreacted sodium carbonate being retained in the aqueous medium at least until separation of said precipitated sodium salt is effected.

3. The method of claim 1 or 2, wherein the relative amounts of the reactants and other process parameters are controlled so that when said sodium salt is to be precipitated, the aqueous medium is saturated with sodium carbonate and said sodium salt at a sodium carbonate concentration less than the invarient concentration for sodium carbonate and consequently at a sodium salt concentration greater than the invarient concentration for said sodium salt.

4. The method as claimed in claim 3 wherein the said saturated state is maintained substantially from commencement of the reaction until after separation of the solids content.

5. The method as claimed in claim 3 wherein the aqueous medium after separation of sodium salt by-product is used as a source of sodium carbonate for subsequent reaction with additional aluminum salt.

6. The method of claim 1 or 2, wherein the relative amounts of the reactants and other process parameters are controlled such that the aqueous medium is unsaturated with respect to both sodium carbonate and said sodium salt, but at the time said sodium salt is desired to be precipitated, the aqueous medium is made saturated with sodium carbonate and said sodium salt at a sodium carbonate concentration less than the invarient concentration for sodium carbonate and consequently at a sodium salt concentration greater than the invarient concentration for said sodium salt.

7. The method of claim 6, wherein at the time of precipitation, a constant temperature is maintained throughout the precipitation of said sodium salt and until said sodium salt is separated from the aqueous medium.

8. The method claimed in claim 6, wherein the aqueous medium after separation of said sodium salt is used as a source of sodium carbonate for subsequent reaction with additional aluminum salt.

9. The method claimed in claim 1, wherein a constant temperature is maintained throughout precipitation of said sodium salt and until separation of said sodium salt from the aqueous medium is effected.

10. The method of claim 1 or 2, wherein the weight ratio of said sodium carbonate to said aluminum salt is at least 15 parts by weight.

11. The method as claimed in claim 1 or 2 wherein at least fifteen parts by weight of sodium carbonate is used per part by weight of the aluminum salt.

12. The method as claimed in claim 1 or 2 wherein the aluminum salt is aluminum chloride.

13. The method as claimed in claim 1 or 2 wherein the pH is in the range 10.2 to 10.5 and the reaction temperature is in the range 40° to 80° C.

* * * * *